(12) United States Patent
Wang et al.

(10) Patent No.: US 10,761,940 B2
(45) Date of Patent: Sep. 1, 2020

(54) METHOD, DEVICE AND PROGRAM PRODUCT FOR REDUCING DATA RECOVERY TIME OF STORAGE SYSTEM

(71) Applicant: EMC IP Holding Company LLC, Hopkinton, MA (US)

(72) Inventors: Yi Wang, Shanghai (CN); Jin Fu, Shanghai (CN); Jun Wu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1 day.

(21) Appl. No.: 16/358,175

(22) Filed: Mar. 19, 2019

(65) Prior Publication Data
US 2019/0332484 A1 Oct. 31, 2019

(30) Foreign Application Priority Data
Apr. 28, 2018 (CN) .......................... 2018 1 0400519

(51) Int. Cl.
*G06F 11/14* (2006.01)
(52) U.S. Cl.
CPC ...... *G06F 11/1448* (2013.01); *G06F 11/1469* (2013.01)
(58) Field of Classification Search
CPC .......................... G06F 11/1448; G06F 11/1469
See application file for complete search history.

(56) References Cited

U.S. PATENT DOCUMENTS

| 2012/0239822 A1* | 9/2012 | Poulson .................. H04Q 3/66 709/239 |
| 2013/0326260 A1* | 12/2013 | Wei ....................... G06F 16/119 714/3 |
| 2018/0211042 A1* | 7/2018 | Reinecke .............. G06F 21/577 |
| 2018/0253362 A1* | 9/2018 | Reinecke ............ G06F 9/45558 |
| 2019/0129813 A1* | 5/2019 | Sankarasubramanian ................... G06F 11/3006 |
| 2019/0370121 A1* | 12/2019 | Ramachandran ... G06F 11/1464 |

* cited by examiner

*Primary Examiner* — Ryan Bertram
(74) *Attorney, Agent, or Firm* — BainwoodHuang

(57) ABSTRACT

Techniques reduce data recovery time of a storage system. The techniques involve: determining a plurality of service layers associated with a data recovery process of the storage system, the plurality of service layers being obtained by partitioning a plurality of services related to the data recovery process based on a data recovery order; in response to a start of data recovery in a target service layer among the plurality of service layers, determining, from at least one service layer lower than the target service layer among the plurality of service layers, at least one service unrelated to the data recovery in the target service layer; and disabling the determined service. With such techniques, unnecessary services in lower layers can be disabled during the data recovery process, and thereby the data recovery time may be reduced.

15 Claims, 4 Drawing Sheets

METHOD, DEVICE AND PROGRAM PRODUCT FOR REDUCING DATA RECOVERY TIME OF STORAGE SYSTEM

CROSS-REFERENCE TO RELATED APPLICATION

This application claims priority to Chinese Patent Application No. CN201810400519.7, on file at the China National Intellectual Property Administration (CNIPA), having a filing date of Apr. 28, 2018, and having "METHOD, DEVICE AND COMPUTER PROGRAM PRODUCT FOR REDUCING DATA RECOVERY TIME" as a title, the contents and teachings of which are herein incorporated by reference in their entirety.

FIELD

The present disclosure relates to the field of storage management, and more specifically, to a method, device and computer program product for reducing data recovery time of a storage system.

BACKGROUND

Recovering data from data corruption is one of the basic functionalities of a storage system. Data recovery time is one of the most critical measures on storage product quality since it would cause Data Unavailable/Data Loss (DU/DL). It is always a problem for the storage system to reduce data recovery time. For example, software layers and software services operating on the storage system and other factors may impact the data recovery time and may have adverse effects on the storage performance.

SUMMARY

The present disclosure provides a method, device and computer program product for reducing data recovery time by enabling or disabling services operating on a storage system.

According to an aspect of the present disclosure, there is provided a method of reducing data recovery time. The method includes: determining a plurality of service layers associated with a data recovery process of the storage system, the plurality of service layers being obtained by partitioning a plurality of services related to the data recovery process based on a data recovery order; in response to a start of data recovery in a target service layer among the plurality of service layers, determining, from at least one service layer lower than the target service layer among the plurality of service layers, at least one service unrelated to the data recovery in the target service layer; and disabling the determined service.

According to another aspect of the present disclosure, there is provided a device for reducing data recovery time. The device includes: one or more processors; a memory coupled to at least one of the one or more processors and having computer program instructions stored therein, the computer program instructions, when executed by the one or more processors, causing the device to: determine a plurality of service layers associated with a data recovery process of the storage system, the plurality of service layers being obtained by partitioning a plurality of services related to the data recovery process based on a data recovery order; in response to a start of data recovery in a target service layer among the plurality of service layers, determine, from at least one service layer lower than the target service layer among the plurality of service layers, at least one service unrelated to the data recovery in the target service layer; and disable the determined service.

According to still another aspect of the present disclosure, there is provided a computer program product. The computer program product is tangibly stored on a non-transient computer readable medium and includes machine executable instructions which, when executed, cause a machine to perform any step of the method according to the previous aspect of the present disclosure.

BRIEF DESCRIPTION OF THE DRAWINGS

Through the following detailed description with reference to the accompanying drawings, the present disclosure will become more comprehensible, and the above and other objectives, details, features and advantages of the present disclosure will become more apparent in which.

DETAILED DESCRIPTION OF EMBODIMENTS

Figure 1:
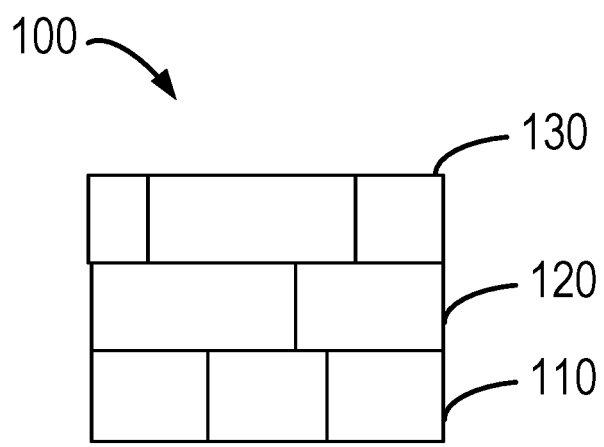
FIG. 1 illustrates a schematic diagram illustrating a service structure involved in a data recovery process of a storage system in accordance with embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described below in more details with reference to the drawings. Although preferred embodiments of the present disclosure are shown in the drawings, it is to be understood that the present disclosure can be implemented in various manners, not limited to the embodiments illustrated herein. On the contrary, these embodiments are provided to make the present disclosure more thorough and complete and convey the scope of the present disclosure completely to those skilled in the art.

FIG. 1 illustrates a schematic diagram of a service structure 100 involved in a data recovery process of a storage system in accordance with embodiments of the present disclosure. As shown, each small block represents a service involved in the data recovery process of the storage system. Depending on the architecture design for the storage software, these services are recovered during the whole data recovery process of the storage system in a certain recovery line, that is, the data of these services is recovered in different orders. Therefore, these services may be partitioned into a plurality of layers, for instance, 2 to 4 layers, based on the data recovery order. Three service layers 110, 120 and 130 are shown in FIG. 1 for the purpose of illustration. However, it is to be understood that the present disclosure is not limited in this regard and different numbers of service layers may be partitioned based on the actual architecture design.

Figure 2:
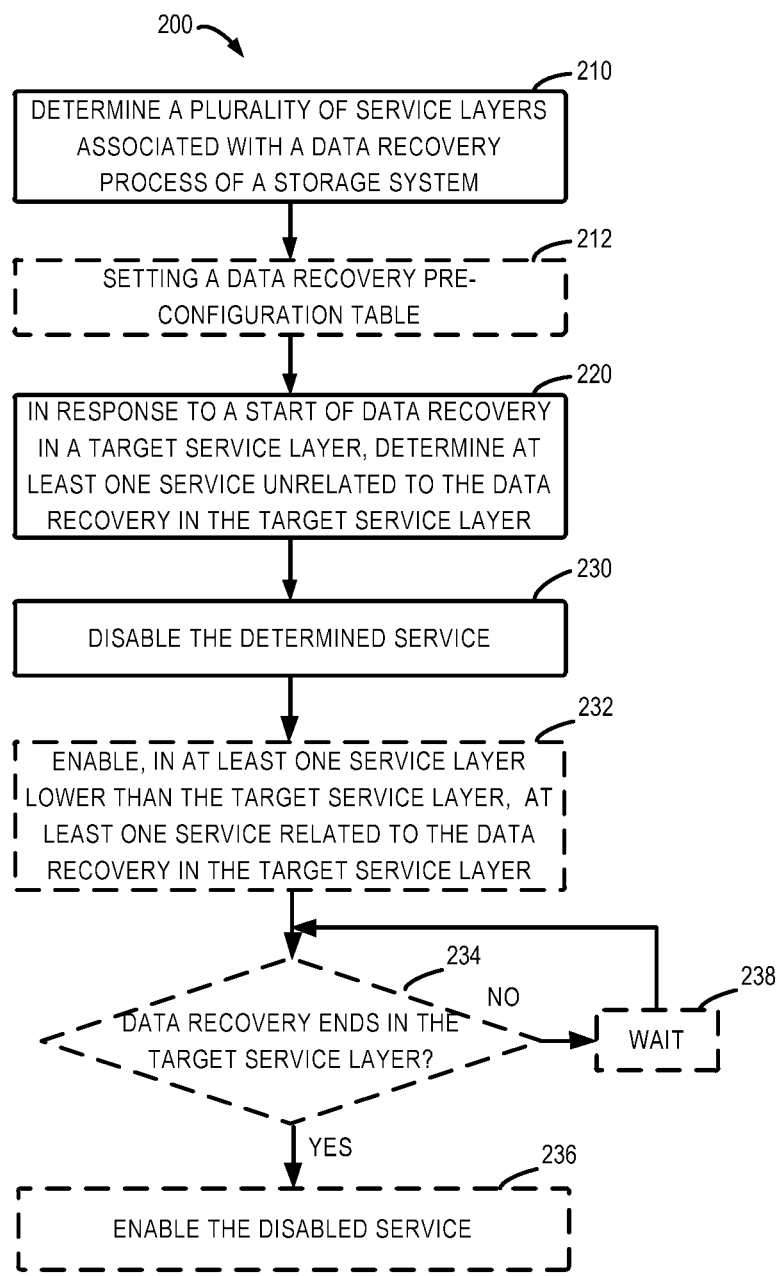
FIG. 2 illustrates a flowchart of a method of reducing data recovery time of the storage system in accordance with embodiments of the present disclosure.

FIG. 2 illustrates a flowchart of a method 200 for reducing data recovery time of the storage system in accordance with embodiments of the present disclosure. The method 200 as shown in FIG. 2 will be described below with reference to the service structure 100 as shown in FIG. 1.

As shown in FIG. 2, the method 200 includes a block 210 where a plurality of service layers associated with the data recovery process of the storage system are determined. The plurality of service layers are obtained by partitioning the plurality of services related to the data recovery process based on the data recovery order.

Taking the service structure 100 shown in FIG. 1 as an example, if a service in the service layer 110, a service in the service layer 120 and a service in the service layer 130 are in a chronological data recovery order of the storage system, then the service layers 110, 120 and 130 may be referred to as a lower layer, a middle layer and an upper layer, respectively, or in the present disclosure, more generally referred to as a first service layer, a second service layer and a third service layer. In a specific implementation, a Redundant Array of Independent Disks (RAID) Group (RAID Group) layer is set as a lower layer, a data block layer is set as middle layer, and a file layer is set as an upper layer.

In existing schemes, during the data recovery of the storage system, the storage system recovers the services of the individual service layers in a chronological data recovery order. At the time of the data recovery of the higher service layer, the data recovery of lower service layers has been completed and the services in these service layers are in the operating state.

In contrast, in the scheme of the present disclosure, some unnecessary services may be stopped or disabled during the data recovery. For example, during the data recovery in a higher service layer, some services in lower service layers unrelated to or having no influence on the data recovery in the higher service layer may be stopped or disabled. In this way, system resources such as a central processing unit (CPU) cycle, an input/output (IO) bandwidth and a memory could be saved to reduce the data recovery time.

To this end, in the method 200, at block 220, when the data recovery starts in a target service layer, at least one service unrelated to the data recovery of the target service layer are determined in at least one service layer lower than the target service layer.

In some embodiments, the service unrelated to the data recovery of the target service layer may be determined by traversing all the services in the layers lower than the target service layer.

In some other embodiments, the service unrelated to the data recovery in the target service layer may be determined with a data recovery pre-configuration table which indicates whether the services in the individual service layers are relevant, that is, when the data recovery starts in each service layer, whether the services in other service layers are disabled. In particular, at block 220, the data recovery pre-configuration table is retrieved, and the services unrelated to data recovery in the target service layer are determined based on the data recovery pre-configuration table.

The data recovery pre-configuration table may be stored statically in the storage system or generated dynamically before the data recovery of the storage system. Therefore, in some embodiments, the method 200 may further include a block 212 where the data recovery pre-configuration table is set. It is to be understood that although the block 212 is shown between block 210 and block 220 in FIG. 2, the present disclosure is not limited to the specific order as shown and the operation of block 212 may be performed at any time before block 220.

Table 1 shows an example data recovery pre-configuration table.

TABLE 1

Data Recovery Pre-configuration Table

| Software Layer | Service Name | Unrelated to data recovery at service layer 110? | Unrelated to data recovery at service layer 120? | Unrelated to data recovery at service layer 130? |
| --- | --- | --- | --- | --- |
| Service Layer 130 | 1301 | NA | NA | NA |
| | 1302 | NA | NA | NA |
| | 1303 | NA | NA | NA |
| Service Layer 120 | 1201 | NA | NA | No |
| | 1202 | NA | NA | Yes |
| Service Layer 110 | 1101 | NA | No | No |
| | 1102 | NA | Yes | Yes |
| | 1103 | NA | Yes | Yes |

Taking the three service layers shown in FIG. 1 as an example, it is assumed that the service layer 110 includes services 1101, 1102 and 1103, the service layer 120 includes services 1201 and 1202, and the service layer 130 includes services 1301, 1302 and 1303.

In some embodiments, the services in the service layer 110 may include a storage pool service, a pool shrink/expansion service and a background zero service and the like. In some embodiments, the services in the service layer 120 may include a data block service, a data block relocation service, an evacuation service and the like. In some embodiments, the services in the service layer 130 may include a file service, an access control list (ACL), quota and the like.

As shown in Table 1, during the recovery of each service layer, the services in this service layer and in a service layer upper to this service layer will not operate and thus will not be considered, that is, all these services are considered to be not available (NA). It is to be considered whether to disable or enable a service in a service layer lower than this service layer.

Taking Table 1 as an example, if it is the service layer 120 (also referred to as a target service layer) in which data is to be recovered currently, the service layer 110 is the service layer lower than the service layer 120 based on the data recovery order. Therefore, it is to be considered whether the services 1101, 1102 and 1103 in the service layer 110 will influence the data recovery in the service layer 120. Assuming that the service 1101 is related to the data recovery in the service layer 120 (shown as "No" in Table 1) while the services 1102 and 1103 are unrelated to the data recovery in the service layer 120 (shown as "Yes" in Table 1), then at block 220, it is determined based on the data recovery pre-configuration table shown in Table 1 that the services 1102 and 1103 are the services unrelated to the data recovery in the service layer 120.

As another example, if it is the service layer 130 (target service layer) in which data is to be recovered currently, the service layers 110 and 120 are the service layers lower than the service layer 130 based on the data recovery order. Therefore, it is to be considered whether the services 1101, 1102 and 1103 in the service layer 110 and the services 1201 and 1202 in the service layer 120 will influence the data recovery in the service layer 130. Assuming that the services 1101 and 1201 are related to the data recovery in the service layer 130 (shown as "No" in Table 1), while the services 1102, 1103 and 1202 are unrelated to the data recovery in the service layer 130 (shown as "Yes" in Table 1), then at block 220, it is determined based on the data recovery pre-configuration table shown in Table 1 that the services 1102, 1103 and 1202 are the services unrelated to data recovery in the service layer 130.

At block 230, the service unrelated to the data recovery in the target service layer determined at block 220 is disabled. In accordance with certain embodiments, disabling the service may involve pausing the service, de-activating the service, terminating the service (which can later be restarted/re-enabled/etc.), inhibiting further process by the service, and so on.

For example, when the target service layer is the service layer 120 shown in Table 1, the services 1102 and 1103 in the service layer 110 are disabled.

As another example, when the target service layer is the service layer 130 shown in Table 1, the services 1102 and 1102 in the service layer 110 and the service 1202 in the service layer 120 are disabled.

In another aspect, if the target service layer is the service layer 110 shown in Table 1, then no service will operate and thus be disabled in the service layers 120 and 130 during the data recovery of the service layer 110 as the service layer 110 is the lowest layer.

In some embodiments, before the data recovery starts in the target service layer, the services automatically start to operate in the service layers lower than the target service layer upon completion of the data recovery in the lower service layers. In this case, disabling the determined services at block 230 may include stopping or suspending the determined (operating) services.

In some other embodiments, before the data recovery starts in the target service layer, the services will not start automatically in the layers lower than the target service layer even though the data recovery is completed in the lower layers. In this case, disabling the determined services at block 230 may include causing the services determined at block 220 not to start.

With the above approach, during the data recovery of the storage system, system resources, such as a CPU cycle, an IO bandwidth and a memory, are saved by disabling specific services, and thereby the data recovery time is reduced.

In some embodiments, before the data recovery starts in the target service layer, the services will not automatically start to operate in the service layers lower than the target service layer even if the data recovery is completed in the lower service layers. In this case, in addition to causing the determined services not to start at block 230, the method 200 may further include block 232 where other services than the determined services are enabled (e.g., permitted or allowed to run, etc.), that is, the services in the service layers lower than the target service layer, related to the data recovery in the target service layer.

Still taking Table 1 as an example, if in the case that the target service layer is the service layer 120, if the services 1102 and 1103 in the service layer 110 are determined at block 220 to be the services unrelated to the data recovery in the service layer 120, then at block 232, the service 1101 in the service layer 110 is enabled (shown as "No" in Table 1).

As another example, if in the case that the target service layer is the service layer 130, it is determined at block 220 that the services 1102 and 1103 in the service layer 110 and the service 1202 in the service layer 120 are the services unrelated with the data recovery in the service layer 130, then at block 232, the service 1101 in the service layer 110 and the service 1201 in the service layer 120 are enabled (shown as "No" in Table 1).

In the present disclosure, the services related to the data recovery of the target service layer may include a service to recover data to be called by the target service layer during the data recovery in the target service layer, which is also referred to as a basic service herein. For example, reading or writing operations need to be performed on the data recovered by the service during the data recovery process of the target service layer. Since the data recovery of a higher service layer needs to call data recovered by the service of a lower service layer, these services need to be maintained in the operating state during the data recovery in the higher service layer. In some embodiments, the basic service may include the storage pool service in the service layer 110 and the block service in the service layer 120, for example.

Accordingly, the services unrelated to the data recovery in the target service layer may include a service to recover data which does not need to be called during the data recovery process of the target service layer. For example, if the function of the service is optimizing the data recovery result of the service layer at which the service is located, then the service may be considered to belong to services to be disabled during the data recovery in the target service layer, or to be unrelated to the data recovery in the target service layer.

Moreover, the method 200 further includes a block 234 where it is determined whether the data recovery ends in the target service layer. In response to determining that the data recovery ends in the target service layer (the determination at block 234 is "Yes"), at block 236, the disabled service such as the service disabled at block 230 is enabled. On the other hand, in response to determining that the data recovery has not ended yet in the target service layer (the determination at block 234 is "No"), at block 238, block 234 is returned to after a predetermined period of time has elapsed, where it is determined again whether the data recovery ends in the target service layer.

Depending on the different implementation requirements, block 234 may be performed during the data recovery process of each target service layer so that the block 236 is performed after the end of data recovery in the corresponding target service layer. Alternatively, block 234 may also be performed during the data recovery process in the highest service layer of the whole storage system so that block 236 is performed after the end of the whole data recovery process.

As a part of the data recovery process of the whole storage system, the above steps 220, 230 (and possibly 232, 234, 236 and 238) are described to perform the data recovery in each target service layer. It is to be understood that the data recovery process of the whole storage system includes performing the above process of the individual target service layers in a chronological data recovery order.

Figure 3:
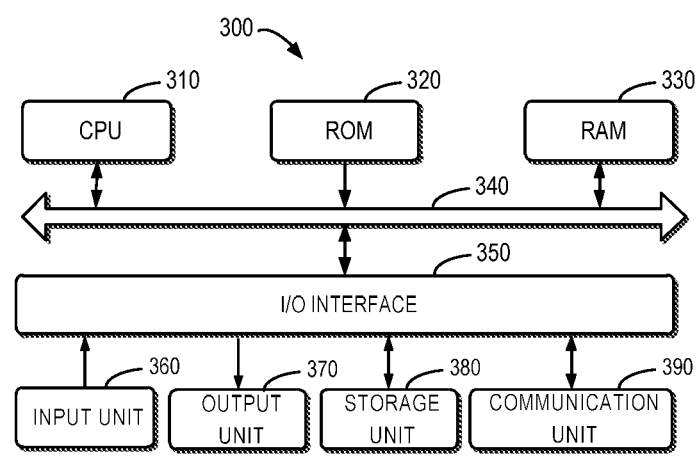
FIG. 3 illustrates a schematic block diagram of an example device that can be used to implement embodiments of the present disclosure.

FIG. 3 shows a schematic block diagram of an example device 300 that can be used to implement embodiments of the present disclosure. As shown in FIG. 3, the device 300 includes a CPU 300 which can execute various appropriate actions and processing based on computer program instructions stored in a read-only memory (ROM) 320 or loaded into a random access memory (RAM) 330 from a storage unit 380. The RAM 330 also stores all kinds of programs and data required by the operation of the device 300. The CPU 310, ROM 320 and RAM 330 are connected to each other via a bus 340, to which an input/output (I/O) interface 350 is also connected.

A plurality of components in the device 300 are connected to the I/O interface 350, including: an input unit 360, such as keyboard, mouse and the like; an output unit 370, such as various types of displays, loudspeakers and the like; a storage unit 380, such as the storage disk, optical disk and the like; and a communication unit 390, such as network card, modem, wireless communication transceiver and the like. The communication unit 390 allows the device 300 to exchange information/data with other devices through computer networks such as Internet and/or various telecommunication networks.

Each procedure and process described above, such as the method 200, can be performed by a processing unit 310. For example, in some embodiments, the method 200 can be implemented as computer software programs, which are tangibly included in a machine-readable medium, such as the storage unit 380. In some embodiments, the computer program can be partially or completely loaded and/or installed into the device 300 via the ROM 320 and/or the communication unit 390. When the computer program is loaded into the RAM 330 and executed by the CPU 310, one or more steps of the above described method 200 are implemented.

Figure 4:
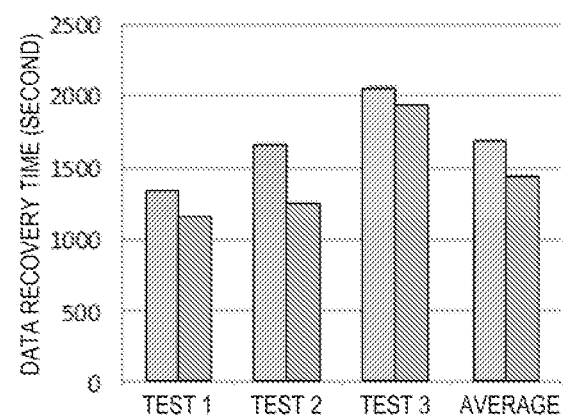
FIG. 4 illustrates a simulation comparison graph of data recovery time according to embodiments of the present disclosure and data recovery time according to an existing scheme.

FIG. 4 shows a simulation comparison graph of the data recovery time according to embodiments of the present disclosure and the data recovery time according to an existing scheme. As shown in FIG. 4, a histogram with left slashes represents the data recovery time according to the existing scheme while a histogram with right slashes represents the data recovery time according to the scheme of embodiments of the present disclosure. From three test results as shown, it can be seen that the data recovery time according to embodiments of the present disclosure is obviously shorter than the data recovery time of the existing scheme. As an average for the three tests, the data recovery time according to embodiments of the present disclosure is reduced by 17% compared with the data recovery time according to the existing scheme.

The present disclosure may be a method, an apparatus, a system and/or a computer program product. The computer program product can include a computer-readable storage medium loaded with computer-readable program instructions thereon for executing various aspects of the present disclosure.

The computer-readable storage medium can be a tangible device capable of holding and storing instructions used by the instruction-executing device. The computer-readable storage medium can be, but not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here can be downloaded from the computer-readable storage medium to various computing/processing devices, or to external computers or external storage devices via Internet, local area network, wide area network and/or wireless network. The network can include copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure can be assembly instructions, instructions of instruction set architecture (ISA), machine instructions, machine-related instructions, microcodes, firmware instructions, state setting data, or a source code or target code written by any combinations of one or more programming languages including object-oriented programming languages, such as Smalltalk, C++ and so on, and conventional procedural programming languages, such as "C" language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit can execute computer-readable program instructions to implement various aspects of the present disclosure.

Various aspects of the present disclosure are described in reference with the flow chart and/or block diagram of the method, device (system) and computer program product according to the embodiments of the present disclosure. It should be understood that each block in the flow chart and/or block diagram and any combinations of various blocks thereof can be implemented by the computer-readable program instructions.

The computer-readable program instructions can be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram.

The computer-readable program instructions can also be stored in the computer-readable storage medium. These instructions enable the computer, the programmable data processing device and/or other devices to operate in a particular way, such that the computer-readable medium storing instructions can include a manufactured article that includes instructions for implementing various aspects of the functions/actions specified in one or more blocks of the flow chart and/or block diagram.

The computer-readable program instructions can also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices can realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method of reducing data recovery time of a storage system, comprising:
   determining a plurality of service layers associated with a data recovery process of the storage system, the plurality of service layers being obtained by partitioning a plurality of services related to the data recovery process based on a data recovery order;
   in response to a start of data recovery in a target service layer among the plurality of service layers, determining, from at least one service layer lower than the target service layer among the plurality of service layers, at least one service unrelated to the data recovery in the target service layer; and
   disabling the determined service.

2. The method according to claim 1, wherein determining the at least one service unrelated to the data recovery in the target service layer comprises:
   retrieving a data recovery pre-configuration table, the data recovery pre-configuration table indicating at a start of data recovery in each of the plurality of service layers, whether services in other service layers of the plurality of service layers are disabled; and
   determining, based on the data recovery pre-configuration table, the at least one service unrelated to the data recovery in the target service layer.

3. The method according to claim 1, further comprising:
   in response to the start of the data recovery in the target service layer, enabling, in a service layer lower than the target service layer, a service related to the data recovery in the target service layer.

4. The method according to claim 3, wherein the at least one service related to the data recovery in the target service layer comprises a service to recover data to be called by the target service layer during the data recovery in the target service layer.

5. The method according to claim 2, further comprising:
   setting the data recovery pre-configuration table.

6. The method according to claim 1, wherein determining the plurality of service layers associated with the data recovery process of the storage system comprises:
   determining that the plurality of service layers associated with the data recovery process of the storage system comprise a first service layer, a second service layer and a third service layer in a chronological data recovery order, and
   wherein disabling the determined service comprises:
   in response to a start of data recovery in the second service layer, disabling, in the first service layer, at least one service unrelated to the data recovery in the second service layer; and
   in response to a start of data recovery in the third service layer, disabling, in the first and second service layers, at least one service unrelated to the data recovery in the third service layer,
   wherein no service is disabled at the start of the data recovery in the first service layer.

7. The method according to claim 1, further comprising:
   in response to an end of the data recovery in the target service layer, enabling the disabled service.

8. A device for reducing data recovery time of a storage system, comprising:
   one or more processors;
   a memory coupled to at least one of the one or more processors and having computer program instructions stored therein, the computer program instructions, when executed by the one or more processors, causing the device to:
   determine a plurality of service layers associated with a data recovery process of the storage system, the plurality of service layers being obtained by partitioning a plurality of services related to the data recovery process based on a data recovery order;
   in response to a start of data recovery in a target service layer among the plurality of service layers, determine, from at least one service layer lower than the target service layer among the plurality of service layers, at least one service unrelated to the data recovery in the target service layer; and disable the determined service.

9. The device according to claim 8, wherein the computer program instructions stored in the memory, when executed by the one or more processors, further cause the device to:

retrieve a data recovery pre-configuration table, the data recovery pre-configuration table indicating at a start of data recovery in each of the plurality of service layers, whether services in other service layers of the plurality of service layers are disabled; and determine, based on the data recovery pre-configuration table, the at least one service unrelated to the data recovery in the target service layer.

10. The device according to claim 8, wherein the computer program instructions stored in the memory, when executed by the one or more processors, further cause the device to:

in response to the start of the data recovery in the target service layer, enable, in a service layer lower than the target service layer, a service related to the data recovery in the target service layer.

11. The device according to claim 10, wherein the at least one service related to the data recovery in the target service layer comprises a service to recover data to be called by the target service layer during the data recovery in the target service layer.

12. The device according to claim 9, wherein the computer program instructions stored in the memory, when executed by the one or more processors, further cause the device to:

set the data recovery pre-configuration table.

13. The device according to claim 8, wherein the computer program instructions stored in the memory, when executed by the one or more processors, further cause the device to:

determine that the plurality of service layers associated with the data recovery process of the storage system comprise a first service layer, a second service layer and a third service layer in a chronological data recovery order, in response to a start of data recovery in the second service layer, disable, in the first service layer, at least one service unrelated to the data recovery in the second service layer, and in response to a start of data recovery in the third service layer, disable, in the first and second service layers, at least one service unrelated to the data recovery in the third service layer; and wherein no service is disabled at the start of the data recovery in the first service layer.

14. The device according to claim 8, wherein the computer program instructions stored in the memory, when executed by the one or more processors, further cause the device to:

in response to an end of the data recovery in the target service layer, enable the disabled service.

15. A computer program product having a non-transitory computer readable medium which stores a set of instructions for reducing data recovery time of a storage system; the set of instructions, when carried out by computerized circuitry of the storage system, causing the computerized circuitry to perform a method of:

determining a plurality of service layers associated with a data recovery process of the storage system, the plurality of service layers being obtained by partitioning a plurality of services related to the data recovery process based on a data recovery order;

in response to a start of data recovery in a target service layer among the plurality of service layers, determining, from at least one service layer lower than the target service layer among the plurality of service layers, at least one service unrelated to the data recovery in the target service layer; and disabling the determined service.

* * * * *